(12) United States Patent
Choi

(10) Patent No.: US 12,031,560 B2
(45) Date of Patent: Jul. 9, 2024

(54) MOUNTING STRUCTURE FOR BEDSTEAD

(71) Applicant: Inno-Sports Co., Ltd, Xiamen (CN)

(72) Inventor: Kwan Jun Choi, Xiamen (CN)

(73) Assignee: Inno-Sports Co., Ltd, Xiamen (CN)

( * ) Notice: Subject to any disclaimer, the term of this patent is extended or adjusted under 35 U.S.C. 154(b) by 349 days.

(21) Appl. No.: 17/701,711

(22) Filed: Mar. 23, 2022

(65) Prior Publication Data
US 2022/0213913 A1 Jul. 7, 2022

Related U.S. Application Data

(63) Continuation-in-part of application No. 16/882,776, filed on May 26, 2020, now Pat. No. 11,333,185.

(30) Foreign Application Priority Data

May 27, 2019 (CN) .......................... 201920775150.8

(51) Int. Cl.
| F16B 12/56 | (2006.01) |
| A47B 57/52 | (2006.01) |
| A47C 19/02 | (2006.01) |
| F16B 12/54 | (2006.01) |
| F16B 12/58 | (2006.01) |
| E04B 1/26 | (2006.01) |

(52) U.S. Cl.
CPC ............ F16B 12/56 (2013.01); A47C 19/021 (2013.01); A47C 19/025 (2013.01); F16B 12/54 (2013.01); F16B 12/58 (2013.01); A47B 57/52 (2013.01); A47C 19/027 (2013.01); E04B 1/2612 (2013.01)

(58) Field of Classification Search
CPC .... F16B 12/56; F16B 12/58; F16B 2200/503; F16B 12/54; F16B 2012/106; F16B 9/052; F16B 9/058; A47C 19/021; A47C 19/005; A47C 19/00; A47C 19/02; A47C 23/062; A47C 19/025; A47C 19/024; E04B 1/2612; A47B 57/52; A47B 57/56; A47B 96/061
USPC ........................................ 5/238, 207; 52/702
See application file for complete search history.

(56) References Cited

U.S. PATENT DOCUMENTS

| 2,492,070 | A  | * | 12/1949 | Stone .................... | A47C 19/025 |
| | | | | | 5/238 |
| 2004/0129845 | A1 | * | 7/2004 | Whale ................... | E04B 1/2612 |
| | | | | | 52/708 |
| 2019/0099006 | A1 | * | 4/2019 | Gerig ..................... | A47C 23/06 |

FOREIGN PATENT DOCUMENTS

KR 20190087127 A * 7/2019 ........... A47C 19/021

* cited by examiner

*Primary Examiner* — David R Hare
*Assistant Examiner* — Madison Emanski
(74) *Attorney, Agent, or Firm* — Bayramoglu Law Offices LLC

(57) ABSTRACT

A mounting structure for a bedstead includes a side rail and a cross rail of the bedstead. The side rail and the cross rail are connected by a connecting member and an inserting member. The connecting member includes a body. The body is provided with a U-shaped groove in which the cross rail is clamped and a first hole located in a middle part of the U-shaped groove. The side rail is provided with a second hole matching with the first hole; and the inserting member is connected to the cross rail after sequentially passing through the second hole and the first hole. The use of the connecting member and the inserting member allows a quick and detachable connection between the side rail and the cross rail, facilitating storage and transportation.

15 Claims, 19 Drawing Sheets

A-A

MOUNTING STRUCTURE FOR BEDSTEAD

CROSS REFERENCE TO THE RELATED APPLICATIONS

This is a continuation-in-part application of U.S. patent Ser. No. 16/882,776, which is based upon and claims priority to Chinese Patent Application No. 201920775150.8, filed on May 27, 2019, the entire contents of which are incorporated herein by reference.

TECHNICAL FIELD

The present invention relates to a mounting structure for a bedstead.

BACKGROUND

Beds are ubiquitous in people's daily life and provide comfortable places for people to rest or sleep. The bed in the prior art generally includes a bedstead, and a cross rail is arranged at the hollow position in the middle of the bedstead to stably support the mattress in place. For the folding bed in the prior art, the bedstead is generally a rectangle formed by two side rails on both sides of the bedstead and two short rails at the front end and the rear end of the bedstead. The side rail and the cross rail are generally perpendicular to each other after being connected. Both the side rail and the cross rail, however, are metal parts and need to be welded together when assembled. This not only increases labor and manufacturing costs, but welding presents risks of injury to persons and property.

SUMMARY

In order to solve the above-mentioned technical problems, an objective of the present invention is to provide a mounting structure for a bedstead.

The present invention is realized by the following technical solutions:

A mounting structure for a bedstead includes a side rail and a cross rail of the bedstead. The side rail and the cross rail are connected by a connecting member. The connecting member includes a body.

In an embodiment of the present invention, the body is provided with a first U-shaped groove in which the side rail is clamped. A second U-shaped groove in which the cross rail is clamped is provided on one side of the body beside the first U-shaped groove. The opening of the second U-shaped groove faces sideward relative to the first U-shaped groove.

In an embodiment of the present invention, the opening of the first U-shaped groove faces downward.

In an embodiment of the present invention, the body includes a first piece body, a second piece body and a third piece body. The first piece body, the second piece body and the third piece body are connected to form the first U-shaped groove. The first piece body and the third piece body are located at two sides of the side rail, respectively, and contact two side end surfaces of the side rail, respectively. The second piece body is located above the side rail and contacts the upper end surface of the side rail.

In an embodiment of the present invention, the first piece body is provided with a first hole, the side rail is provided with a second hole, and the first hole coincides with the second hole. An inserting member passes through the first hole and the second hole. Preferably, the inserting member can be a connecting screw or a connecting bolt.

In an embodiment of the present invention, the end surface of the first piece body and/or the third piece body in contact with the side rail is provided with a protruding column. The side rail is provided with the second hole matched with the protruding column.

In an embodiment of the present invention, the outer diameter of the protruding column gradually increases from one end of the protruding column inserted into the second hole to the other end of the protruding column.

In an embodiment of the present invention, the other end surface of the third piece body is provided with a fourth piece body, a fifth piece body and a sixth piece body, wherein the other end surface of the third piece body is opposite to the end surface of the third piece body in contact with the side rail. The fourth piece body, the fifth piece body and the sixth piece body are connected to form the second U-shaped groove. The fourth piece body and the sixth piece body contact the front end surface and the rear end surface of the cross rail, respectively. The upper end surface of the fifth piece body contacts the lower end surface of the cross rail.

In an embodiment of the present invention, one end of each of the fourth piece body and the sixth piece body away from the fifth piece body is provided with a curved surface.

In an embodiment of the present invention, the opening of the first U-shaped groove faces laterally relative to the side rail.

In an embodiment of the present invention, the body includes a seventh piece body, an eighth piece body, and a ninth piece body. The seventh piece body, the eighth piece body and the ninth piece body are connected to form the first U-shaped groove. The seventh piece body and the ninth piece body are located at the upper side and the lower side of the side rail, respectively, and contact the upper end surface and the lower end surface of the side rail, respectively. The eighth piece body is located at the side of the side rail and contacts the side end surface of the side rail.

In an embodiment of the present invention, the body does not have the first U-shaped groove but only includes a tenth piece body. The second U-shaped groove and the first hole are provided on the tenth piece body, and the end of the cross rail can be provided with a third hole matching with the first hole and the second hole. The inserting member can pass through the first hole, the second hole, and the third hole to achieve a detachable connection of the side rail, the connecting member, and the cross rail. The inserting member is preferably a connecting screw or a connecting bolt.

In an embodiment of the present invention, the body does not have the first U-shaped groove but includes the tenth piece body and an eleventh piece body that form an L-shaped configuration.

In an embodiment of the present invention, an aligning structure is further provided between the connecting member and the side rail to realize a quick alignment of the first hole and the second hole.

In an embodiment of the present invention, the aligning structure includes a protruding block and an aligning hole. The protruding block is provided on the side of the tenth piece body opposite to the second U-shaped groove, and the aligning hole is provided on the side rail for matching with the protruding block to realize the alignment.

In an embodiment of the present invention, the protruding block is provided adjacent to the first hole but not overlapped with the first hole.

In an embodiment of the present invention, the first hole is overlapped with the protruding block, and the aligning hole is overlapped with the second hole.

In an embodiment of the present invention, both the protruding block and the aligning hole are in a cylindrical shape.

In an embodiment of the present invention, the protruding block and the aligning hole each are in a polygon shape, and the polygon shape includes but not limited to rectangle, square, triangle, hexagon, and star shape.

In an embodiment, the first hole is in a stepped configuration, a diameter of which at the side adjacent to the second U-shaped groove is larger than a diameter of which at the side adjacent to the side rail.

The mounting structure for the bedstead of the present invention has the following advantages. 1. The cross rail and the side rail are connected by a connecting member rather than a welding process, which not only diminishes the difficulty in production, but also avoids potential injury to workers during the welding process. 2. The cross rail and the side rail can be quickly, simply and conveniently connected by the snap-fit connection. 3. The combined use of the connecting member and the inserting member achieves a rapid and detachable connection of the side rail and the cross rail, which facilitates storage and transportation. 4. The arrangement of the alignment structure between the connecting member and the side rail enables a quick alignment of the first hole and the second hole, thereby simplifying the connection.

BRIEF DESCRIPTION OF THE DRAWINGS

In order to more clearly explain the technical solutions of the present invention, the drawings for the description of the prior art and the embodiments will be briefly illustrated hereinafter. Obviously, the drawings in the following description are only some embodiments of the present invention, and those skilled in the art can also obtain other drawings based on these drawings without creative efforts.

DETAILED DESCRIPTION OF THE EMBODIMENTS

The technical solutions of the embodiments of the present invention will be described clearly and completely below with reference to the drawings in the embodiments of the present invention. Obviously, the described embodiments are only a part of the embodiments of the present invention rather than all the embodiments. Based on the embodiments of the present invention, all other embodiments obtained by those skilled in the art without creative efforts shall fall within the scope of protection of the present invention.

The "embodiment(s)" herein refers to a particular feature, structure, or characteristic that may be included in at least one implementation of the present invention. In the description of the present invention, it should be understood that the orientations or positional relationships indicated by the terms "upper", "lower", "top", "bottom", etc. are based on the orientations or positional relationships shown in the accompanying drawings, which is only intended to facilitate the description of the present invention and simplify the description, not to indicate or imply that the indicated device or element must have a specific orientation, be constructed and operated in a specific orientation, and therefore should not be construed as a limitation of the present invention. In addition, the terms "first", "second", etc. are only used for the purpose of description, and should not be construed as indicating or implying relative importance or implicitly expressing the number of indicated technical features. Thus, a feature defined by "first" or "second" may expressly or implicitly include one or more of the feature. Also, the terms "first," "second," etc. are used to distinguish similar objects, and are not necessarily used to describe a particular order or precedence. It is understandable that such features may be interchanged under appropriate circumstances, so that the embodiments of the present invention described herein can be implemented in an order other than those illustrated or described herein.

Figure 1:
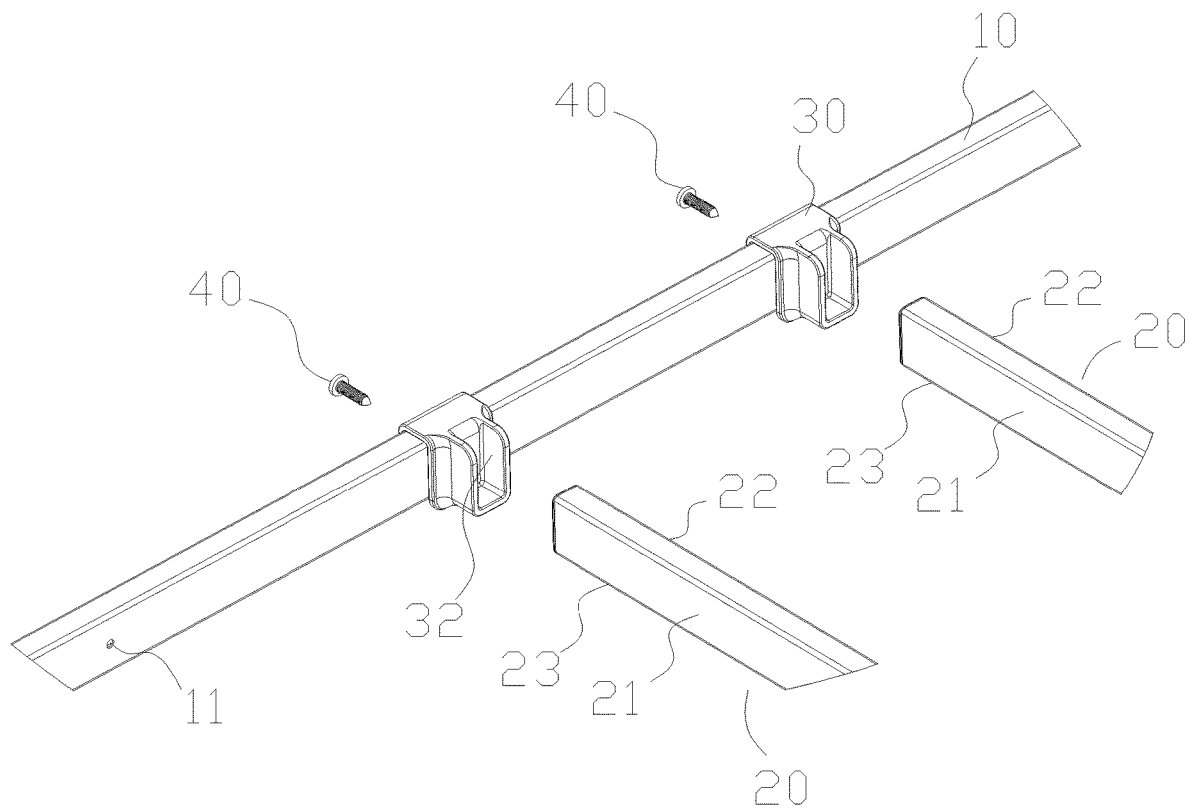
FIG. 1 is a schematic diagram showing the present invention before the installation of the side rail and the cross rail.
Figure 2:
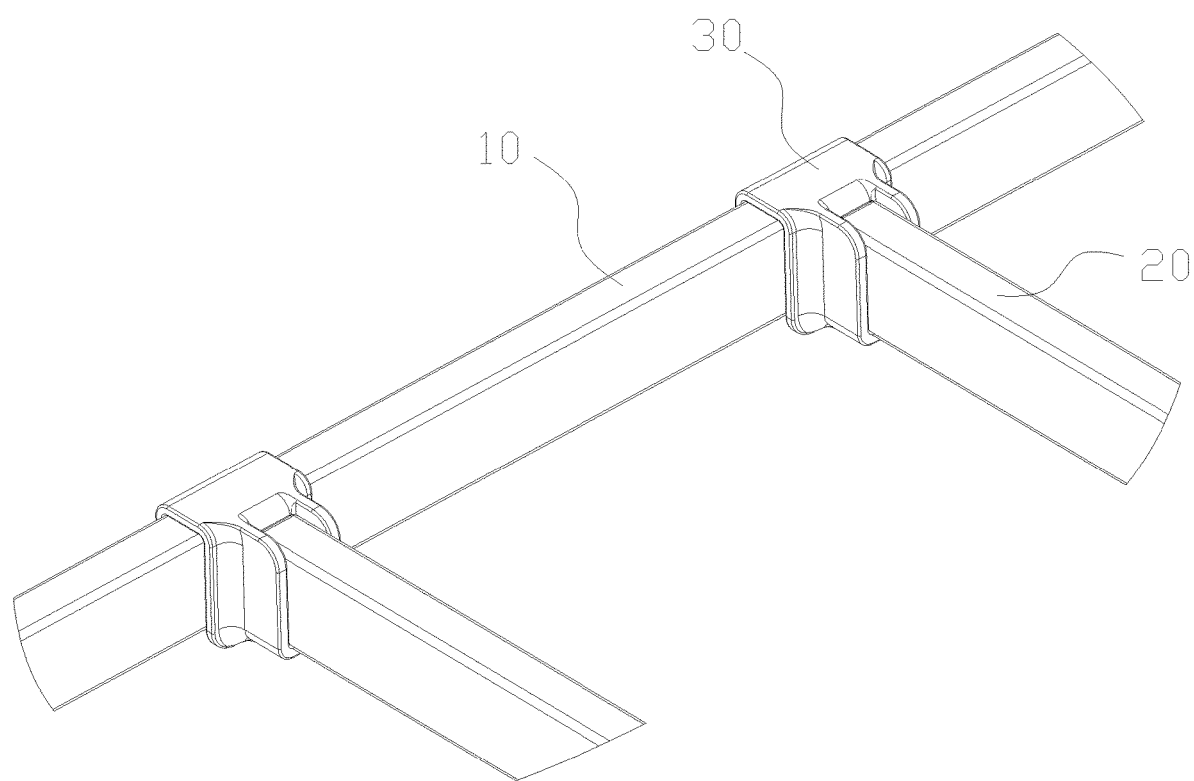
FIG. 2 is a schematic view showing the present invention after the installation of the side rail and the cross rail.

Referring to FIG. 1 and FIG. 2, a mounting structure for a bedstead includes the side rail 10 and the cross rail 20 of the bedstead. In normal use, the side rail 10 and the cross rail 20 are perpendicularly connected. The side rail 10 extends along the length direction of the bedstead, that is, at the front end and the rear end of the bedstead. The cross rail 20 is located in the width direction of the bedstead, that is, at the left side end and the right side end of the bedstead. The side rail 10 and the cross rail 20 are connected by the connecting member 30. The connecting member 30 includes the body 1.

Figure 3:
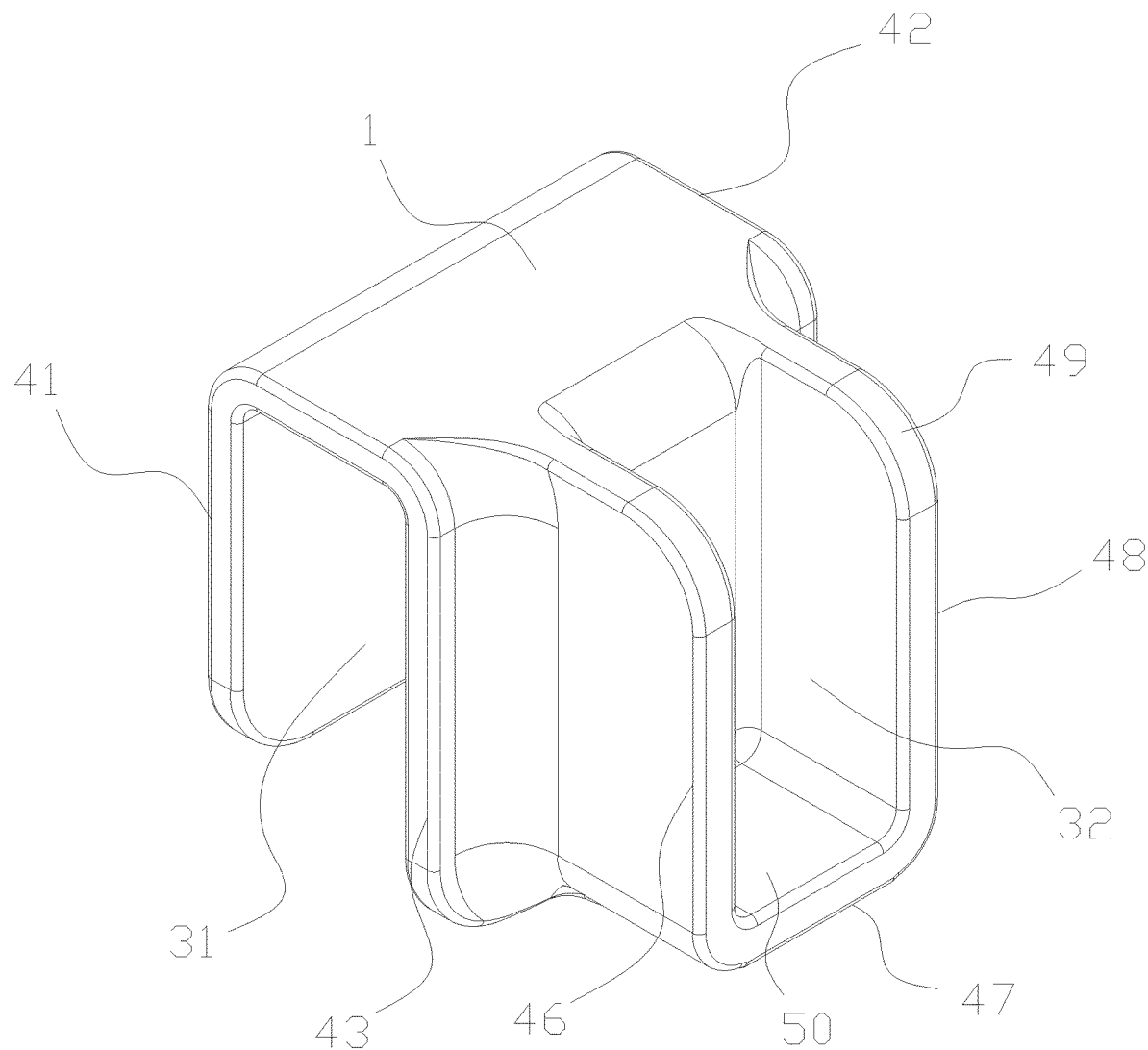
FIG. 3 is a perspective view of the connecting member according to the first embodiment of the present invention.
Figure 4:
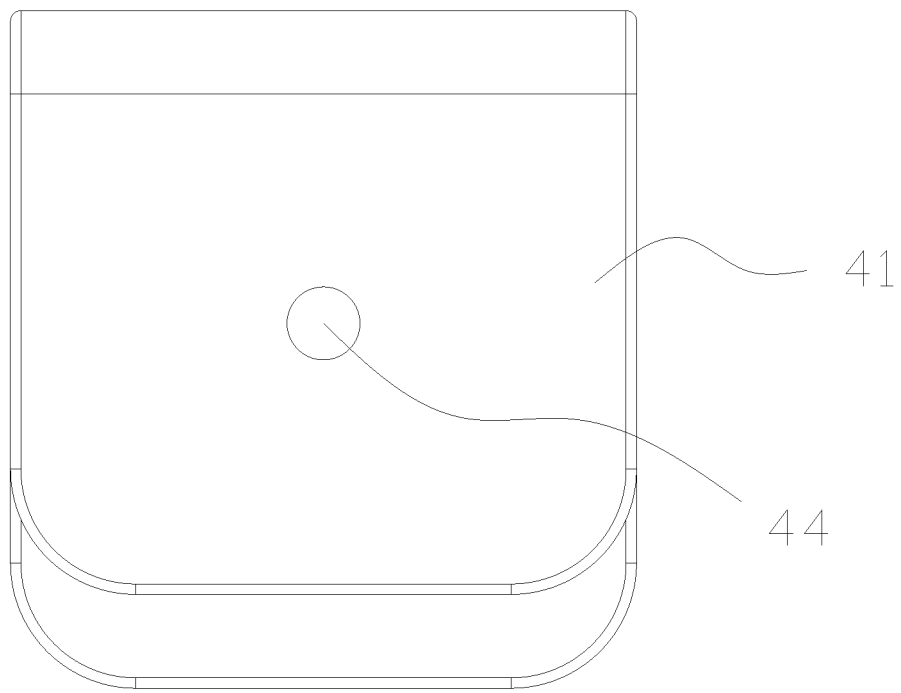
FIG. 4 is a schematic diagram showing the connecting member according to the first embodiment of the present invention.

In the first embodiment of the present invention, further referring to FIG. 3 and FIG. 4, the body 1 is provided with the first U-shaped groove 31 in which the side rail 10 is clamped. The opening of the first U-shaped groove 31 faces downward. The body 1 lateral to the first U-shaped groove 31 is further provided with the second U-shaped groove 32 in which the cross rail 20 is clamped. The opening of the second U-shaped groove 32 faces sideward. In the present invention, the first U-shaped groove 31 is tightly connected to the side rail 10, and then one end of the cross rail 20 is clamped in the second U-shaped groove 32. In use, the bedstead includes two side rails 10 parallel to each other, the connecting member 30 is connected to the corresponding position of each side rail 10, and then the two ends of the cross rail 20 are connected to the second U-shaped grooves 32 of the two connecting members 30, respectively.

Specifically, the body 1 includes the first piece body 41, the second piece body 42 and the third piece body 43. The first piece body 41, the second piece body 42 and the third piece body 43 are connected to form the first U-shaped groove 31. The first piece body 41 and the third piece body 43 are located at the two sides of the side rail 10, respectively, and contact two side end surfaces of the side rail 10, respectively. The second piece body 42 is located above the side rail 10 and contacts the upper end surface of the side rail 10.

Further, the third piece body 43 is provided with the fourth piece body 46, the fifth piece body 47 and the sixth piece body 48. The fourth piece body 46, the fifth piece body 47 and the sixth piece body 48 are connected to form the second U-shaped groove 32. The fourth piece body 46 and the sixth piece body 48 contact the front end surface 21 and the rear end surface 22 of the cross rail 20, respectively. The upper end surface 50 of the fifth piece body 47 contacts the lower end surface 23 of the cross rail 20.

One end of each of the fourth piece body 46 and the sixth piece body 48 away from the fifth piece body 47 is provided with the curved surface 49.

The first piece body 41 is provided with the first hole 44, the side rail 10 is provided with the second hole 11, and the first hole 44 coincides with the second hole 11. The inserting member 40 passes through the first hole 44 and the second hole 11. The inserting member 40 is preferably a connecting screw or a connecting bolt. Alternatively, the third piece body 43 can also be provided with a first hole corresponding to the first hole 44 of the first piece body 41.

Figure 5:
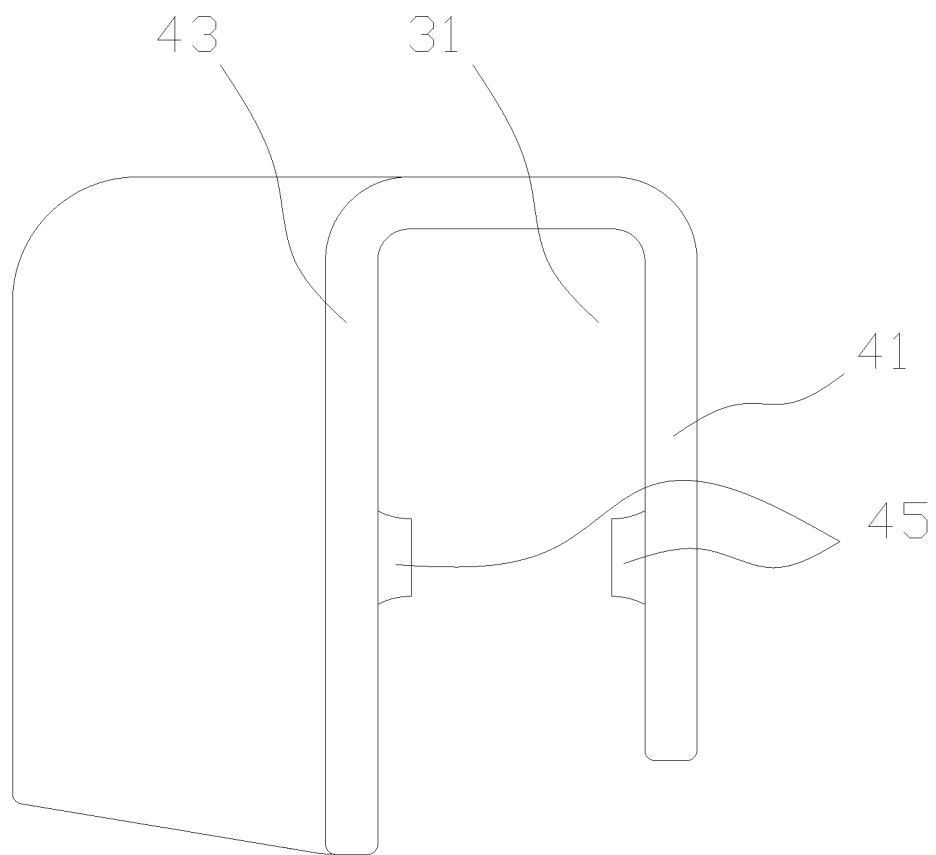
FIG. 5 is a schematic diagram showing the connecting member according to the second embodiment of the present invention.

In the second embodiment of the present invention, referring to FIG. 5, the only difference from the first embodiment is that the first hole 44 is not provided, instead, the end surface of the first piece body 41 and/or the third piece body 43 in contact with the side rail 10 is provided with the protruding column 45. The second hole 11 provided on the side rail 10 can be matched with the protruding column 45. The outer diameter of the protruding column 45 gradually increases from one end inserted into the second hole 11 to the other end, to allow the protruding column 45 to smoothly slide into and be clamped inside the second hole 11. In other words, the two ends of the protruding column 45 form a guide surface, and the guide surface can be a curved surface.

Figure 6:
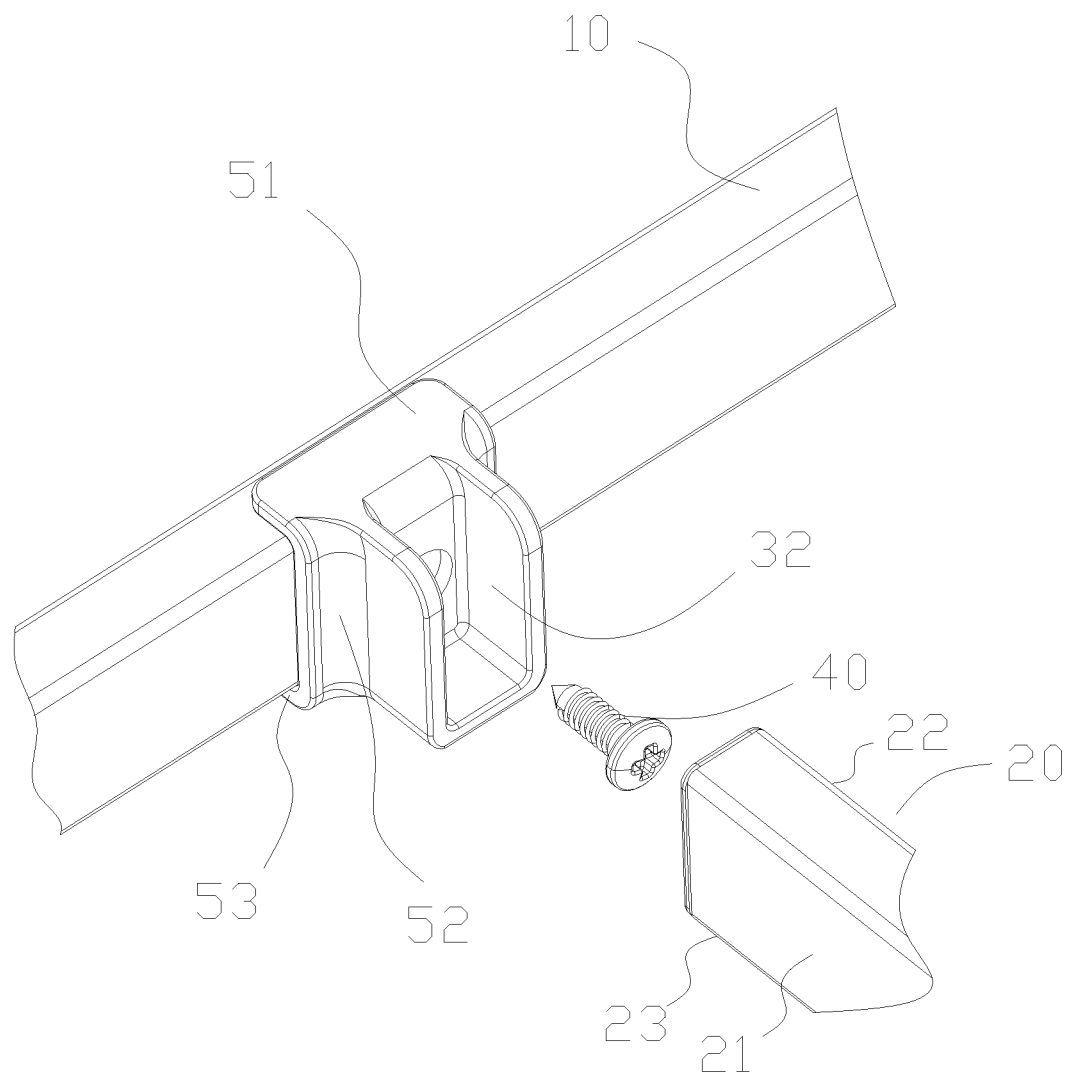
FIG. 6 is a schematic diagram showing the fit of the connecting member according to the third embodiment of the present invention.
Figure 7:
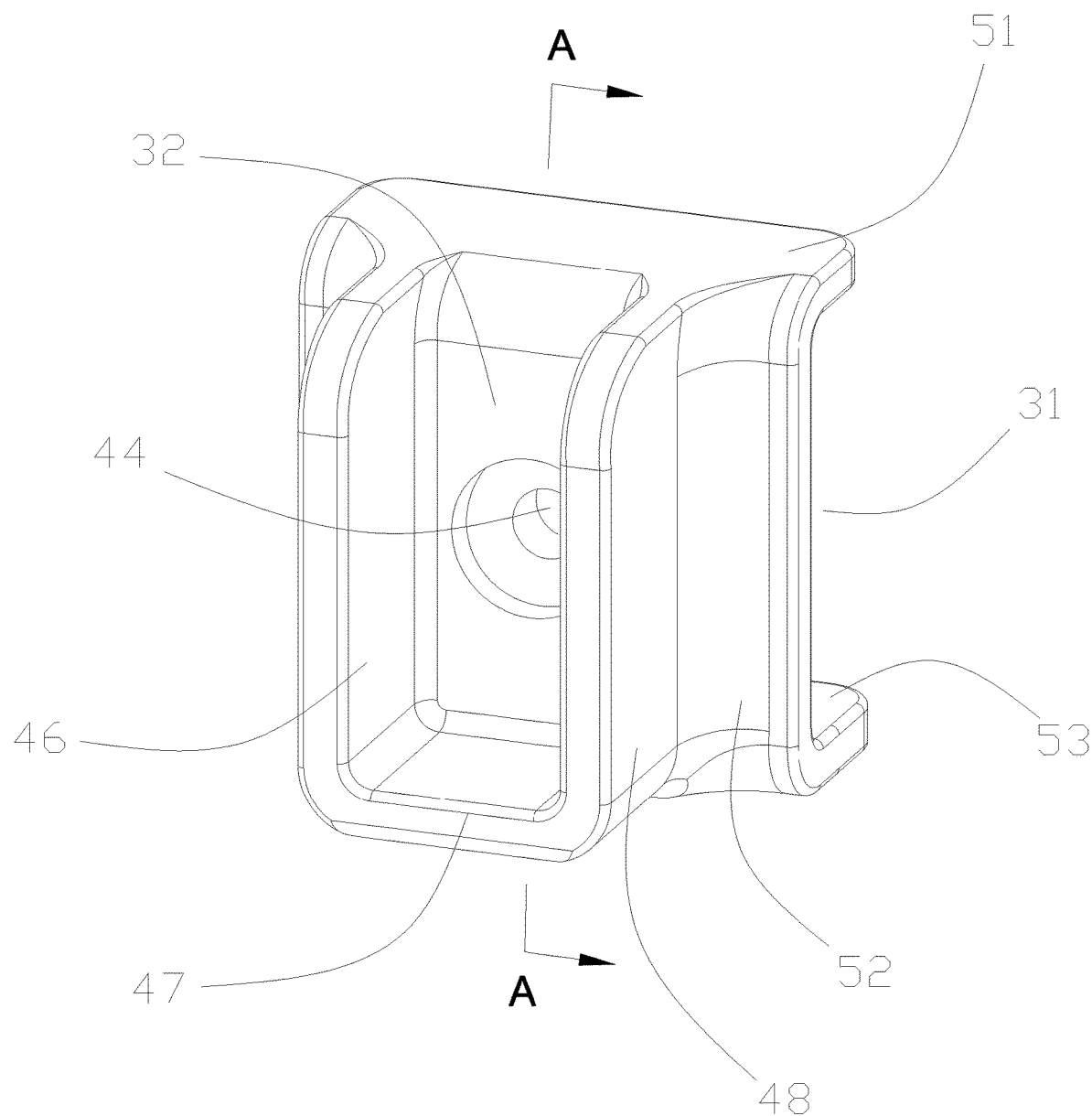
FIG. 7 is a schematic diagram showing the connecting member according to the third embodiment of the present invention.
Figure 8:
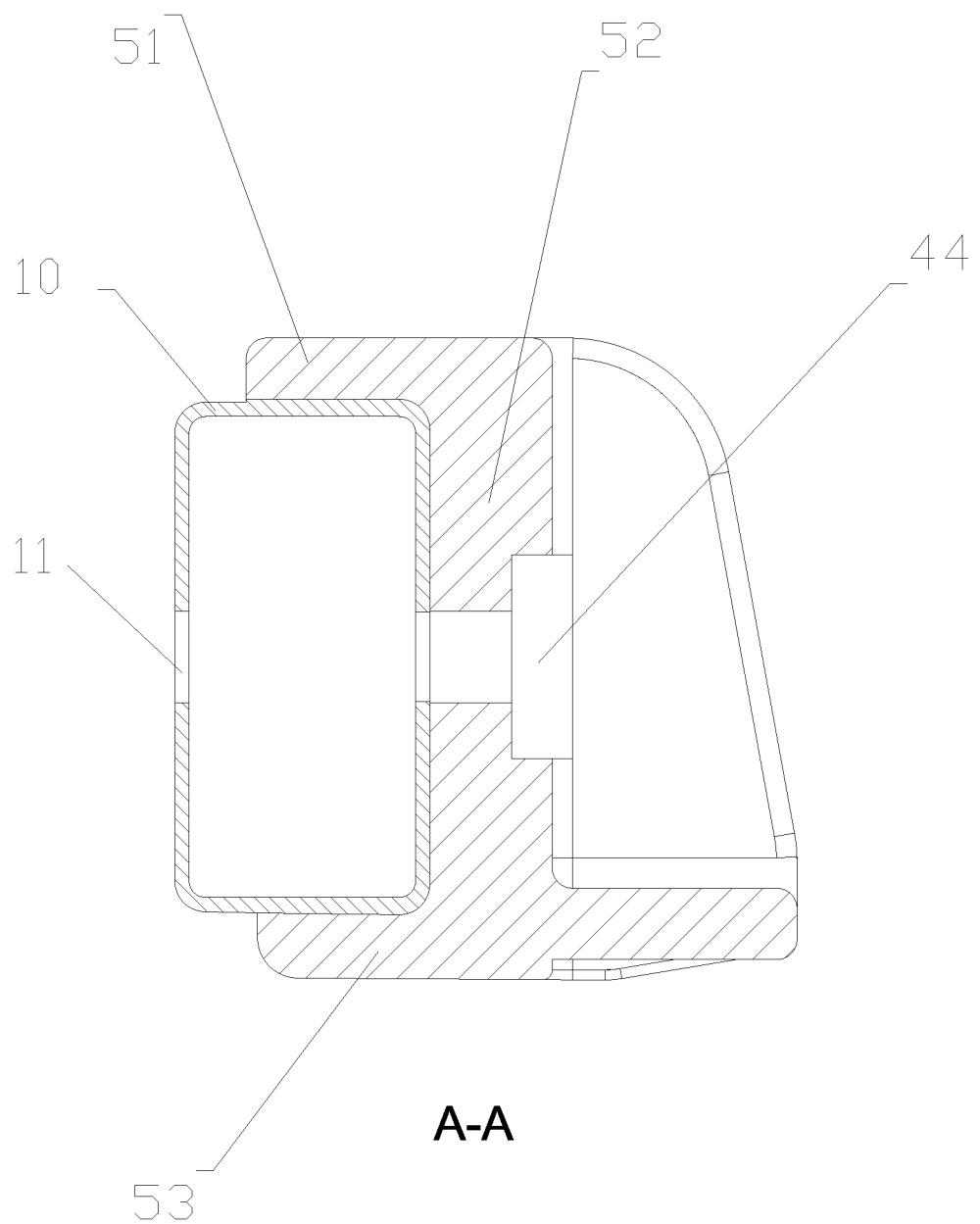
FIG. 8 is a cross-sectional view of the connecting member along the A-A direction in FIG. 7 assembled with the side rail

In the third embodiment of the present invention, referring to FIG. 6-FIG. 8, the opening of the first U-shaped groove 31 faces laterally relative to the side rail 10. In the present embodiment, the body 1 includes the seventh piece body 51, the eighth piece body 52 and the ninth piece body 53 instead of the first piece body 41, the second piece body 42 and the third piece body 43. The seventh piece body 51, the eighth piece body 52 and the ninth piece body 53 are connected to form the first U-shaped groove 31. The seventh piece body 51 and the ninth piece body 53 are located at the upper side and the lower side of the side rail 10, respectively, and contact the upper end surface and the lower end surface of the side rail 10, respectively. The eighth piece body 52 is located at the side of the side rail 10 and contacts the side end surface of the side rail 10. For a better fit, the eighth piece body 52 is provided with the first hole 44, and the connecting member 30 is fastened with the side rail 10 by the inserting member 40 passing through the first hole 44. The inserting member 40 is preferably a connecting screw or a connecting bolt. The end surface of the eighth piece body 52 facing opposite to the side rail 10 is provided with the fourth piece body 46, the fifth piece body 47 and the sixth piece body 48 that are connected to form the second U-shaped groove 32. The same parts and structures described above with respect to the first U-shaped groove 31 may be equally applied to the description of the second U-shaped groove 32.

Figure 9:
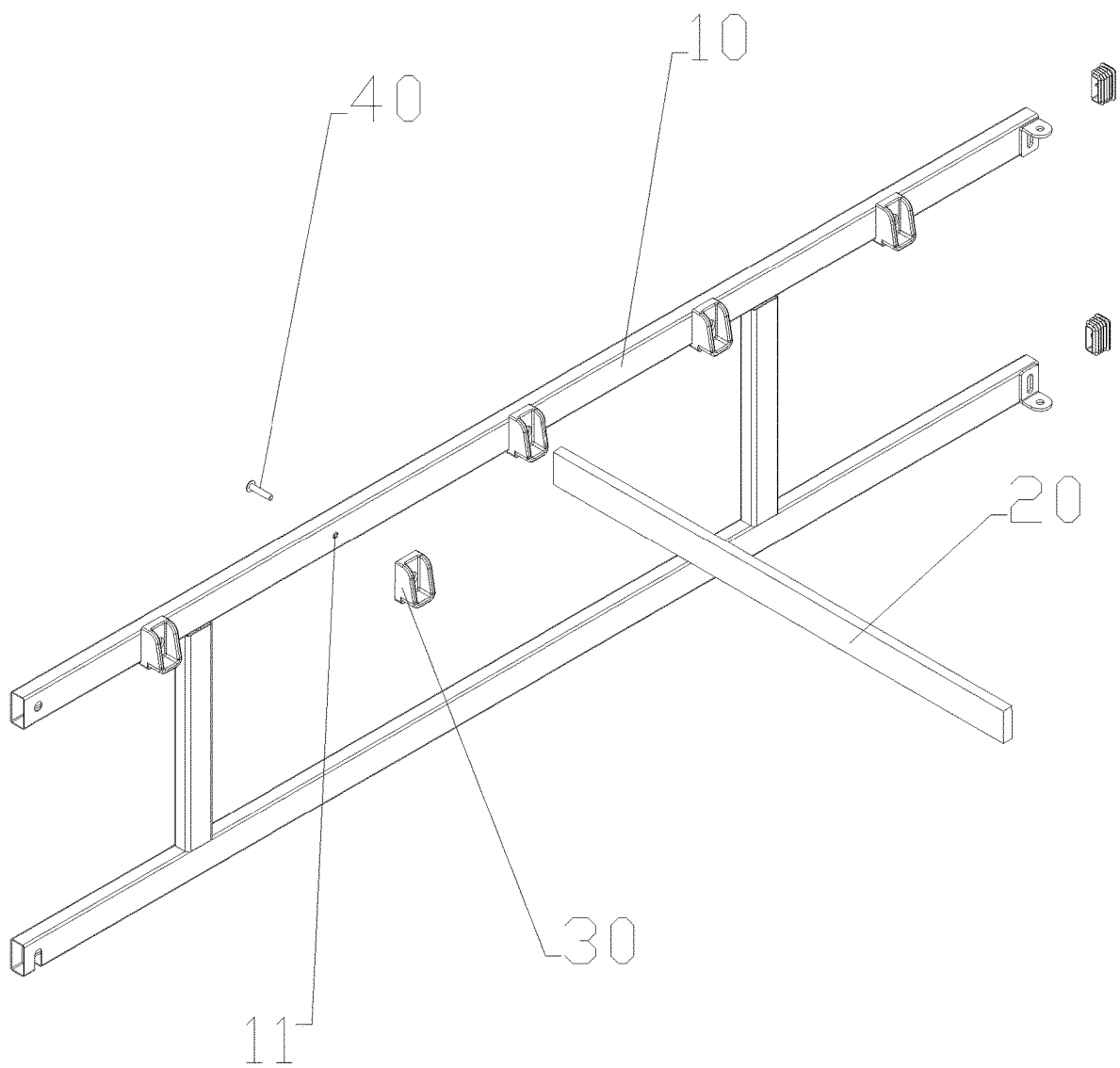
FIG. 9 is a schematic view showing the bedstead being assembled according to the fourth embodiment of the present invention after the installation of the side rail and the cross rail.
Figure 10:
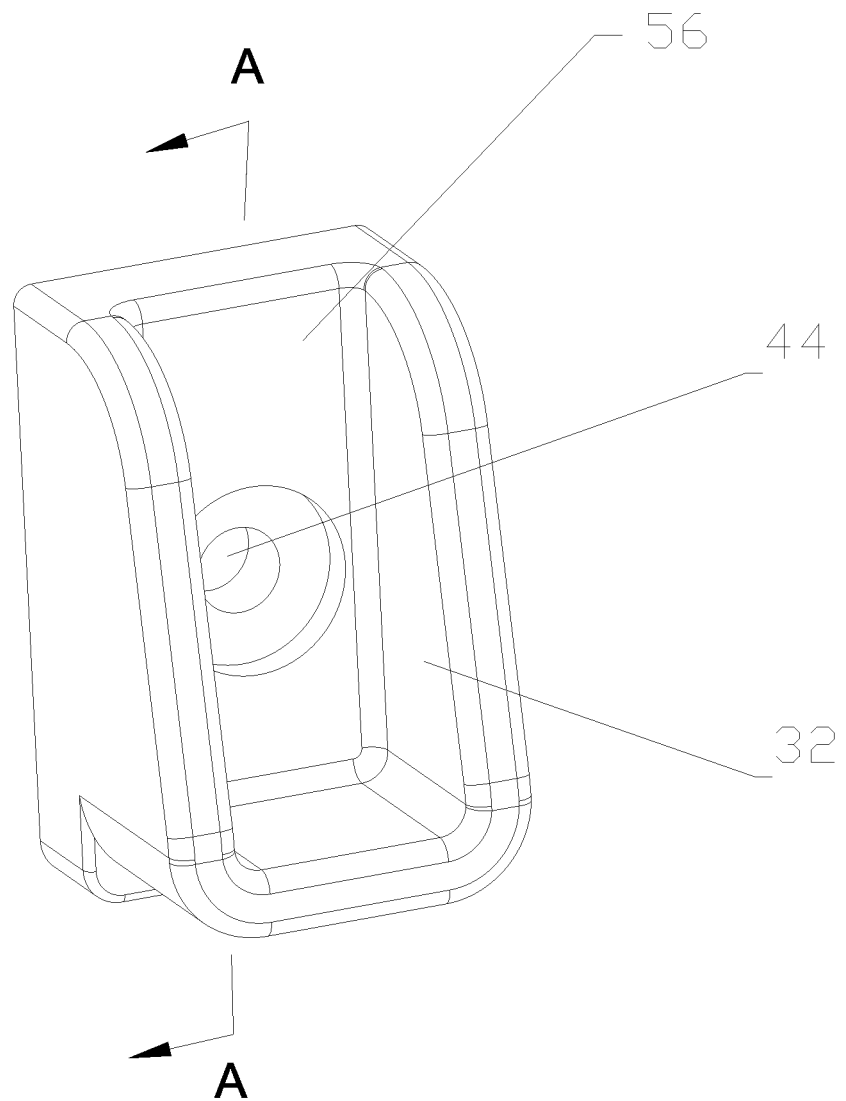
FIG. 10 is a perspective view of the connecting member according to the fourth embodiment of the present invention.
Figure 11:
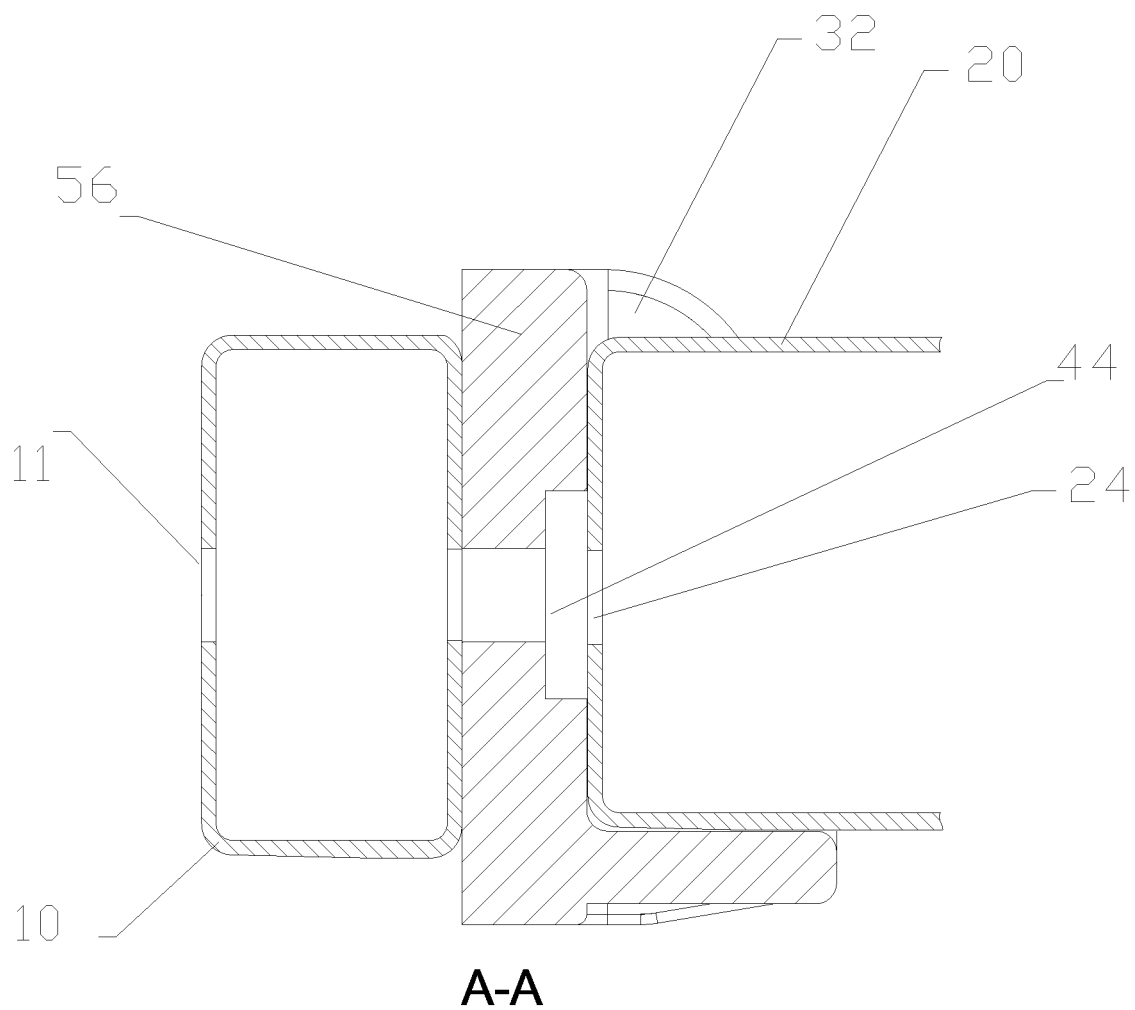
FIG. 11 is a cross-sectional view of the connecting member along the A-A direction in FIG. 10 assembled with the side rail and the cross rail.

In the fourth embodiment of the present invention, referring to FIG. 9-FIG. 11, the body 1 only includes the tenth piece body 56, the second U-shaped groove 32 and the first hole 44 are provided on the tenth piece body 56. The second hole 11 on the side rail 10 coincides with the first hole 44, and the end of the cross rail 20 can be provided with the third hole 24 matching the first hole 44 and the second hole 11. The inserting member 40 sequentially passes through the second hole 11, the first hole 44, and the third hole 24 to fasten the side rail 10, the connecting member 30, and the cross rail 20 together. The first hole 44 is in a stepped configuration, a diameter of which at the side adjacent to the second U-shaped groove 32 is larger than a diameter of which at the side adjacent to the side rail 10. The inserting member 40 is preferably a connecting screw or a connecting bolt. The cooperation of the inserting member 40 and the holes realizes a detachable connection of the side rail 10, the connecting member 30, and the cross rail 20.

Figure 12:
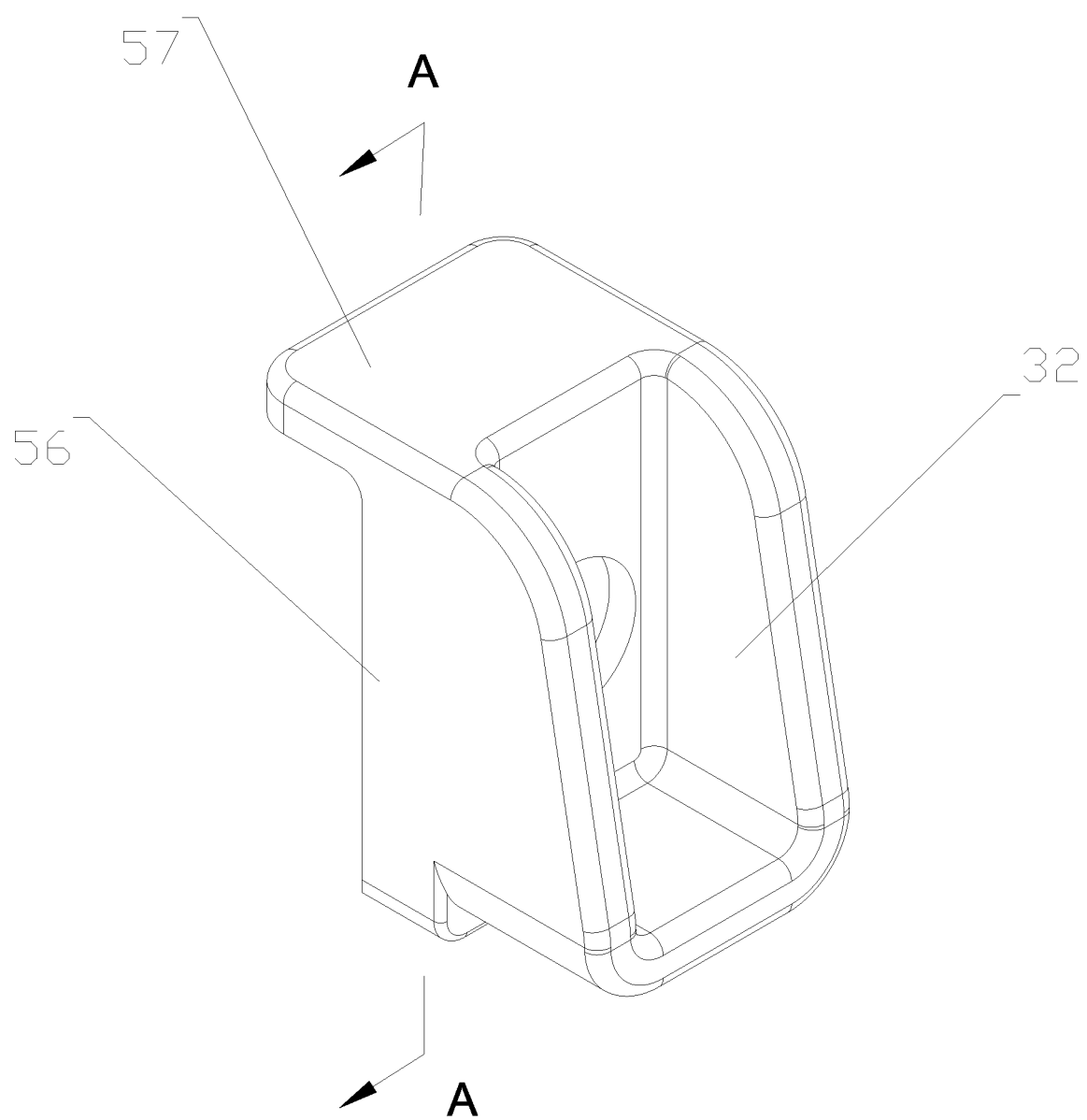
FIG. 12 is a perspective view of the connecting member according to the fifth embodiment of the present invention.
Figure 13:
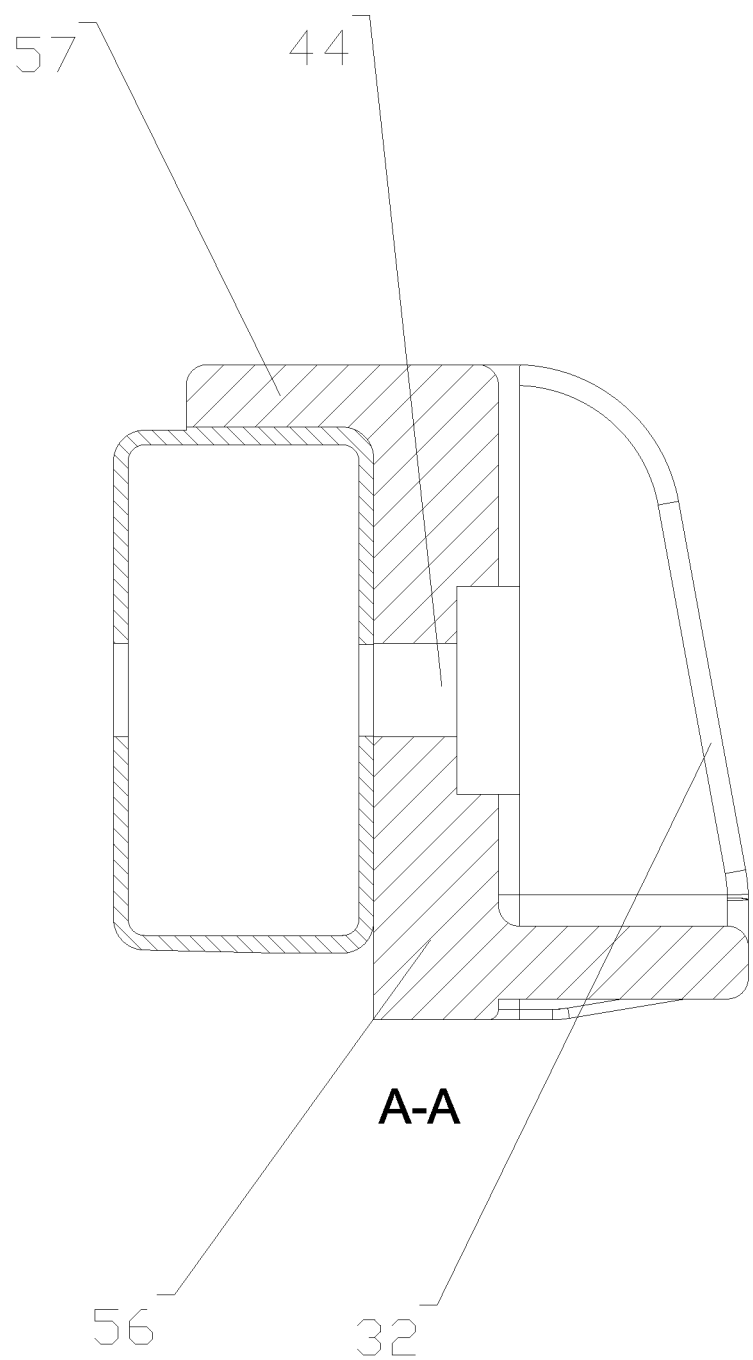
FIG. 13 is a cross-sectional view of the connecting member along the A-A direction in FIG. 12 assembled with the side rail.

In the fifth embodiment of the present invention, referring to FIG. 12 and FIG. 13, the difference from the fourth embodiment is that the body further includes the eleventh piece body 57 which forms an L-shaped configuration with the tenth piece body 56. The L-shaped configuration enables the connecting member 30 to fit with and hang on the side rail 10, so as to prevent the connecting member 30 from moving relative to the side rail 10.

Figure 14:
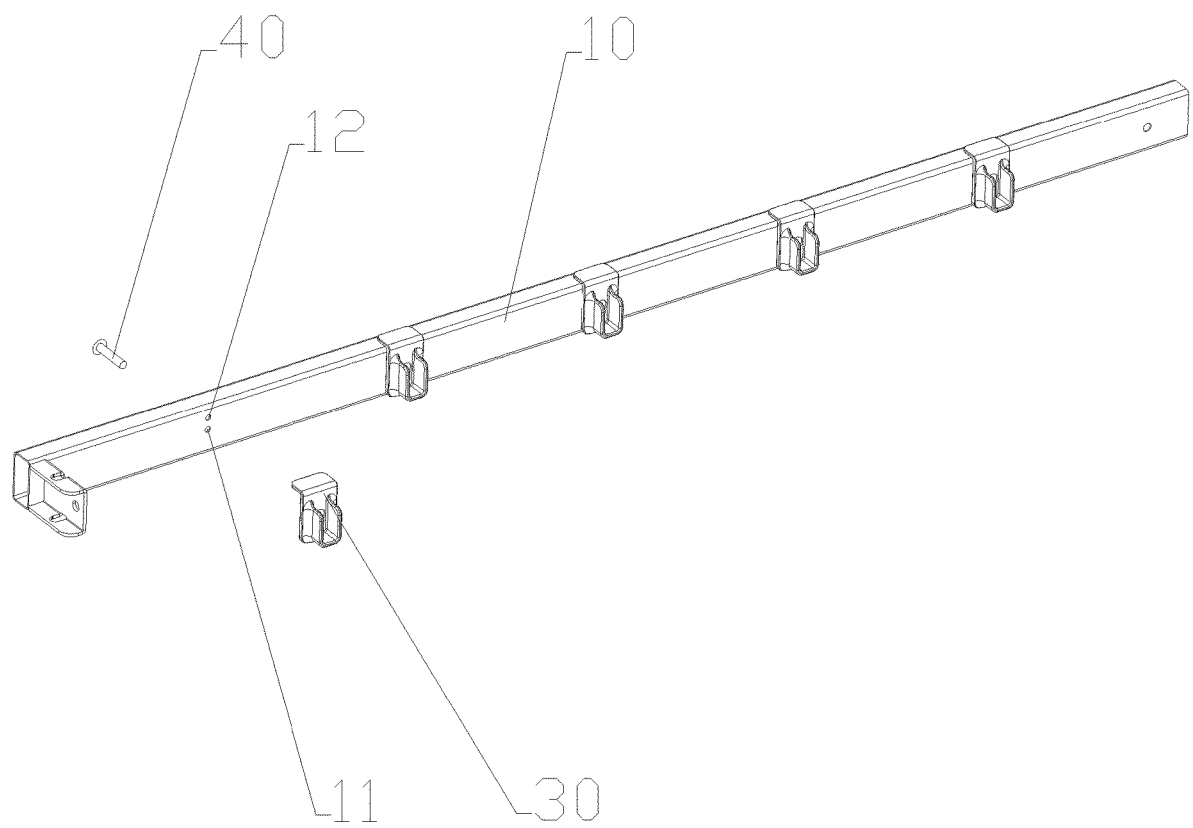
FIG. 14 is a schematic view showing the connecting member mounted on the side rail according to the sixth embodiment of the present invention.
Figure 15:
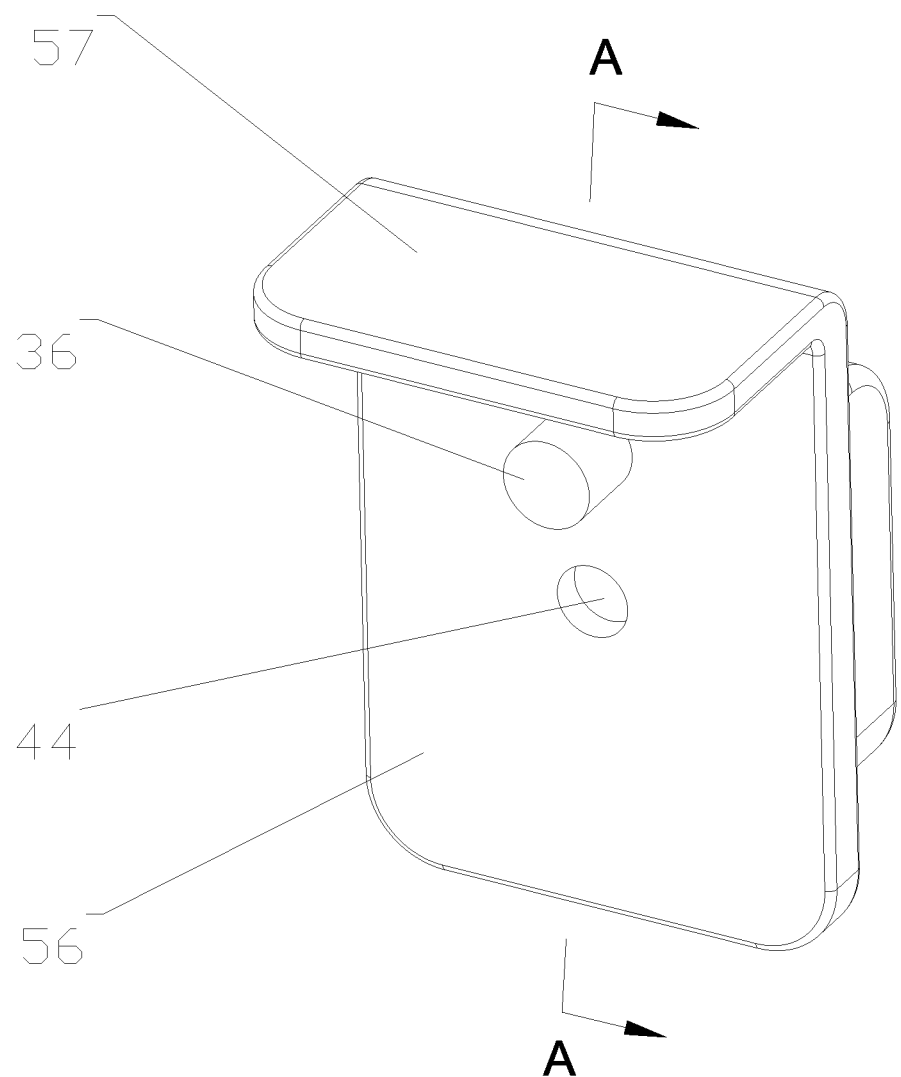
FIG. 15 is a perspective view of the connecting member according to the sixth embodiment of the present invention.
Figure 16:
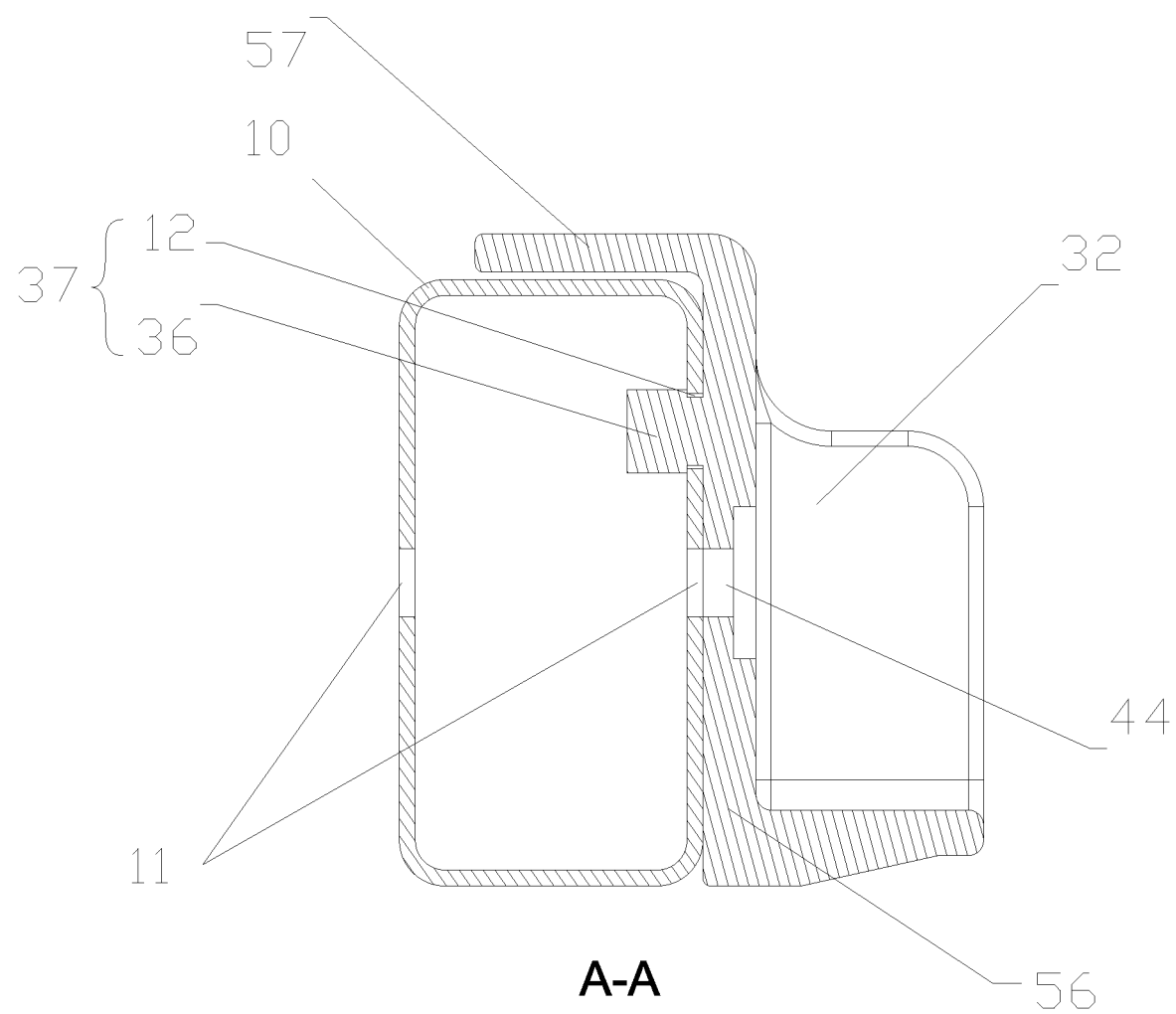
FIG. 16 is a cross-sectional view of the connecting member along the A-A direction in FIG. 15 assembled with the side rail.

In the sixth embodiment of the present invention, referring to FIG. 14-FIG. 16, the difference from the fifth embodiment is that the aligning structure 37 is provided between the connecting member 30 and the side rail 10 to realize a quick alignment of the first hole 44 and the second hole 11. The aligning structure 37 includes the protruding block 36 and the aligning hole 12. The protruding block 36 is provided on the side of the tenth piece body 56 opposite to the second U-shaped groove 32, and the aligning hole 12 is provided on the side rail 10 for matching with the protruding block 36 to realize the alignment. The protruding block 36 is provided adjacent to the first hole 44 but not overlapped with the first hole 44. The protruding block 36 is in a cylindrical shape. When the protruding block 36 is engaged into the aligning hole 12, the first hole 44 coincides with the second hole 11, and the inserting member 40 can pass through the first hole 44 and the second hole 11.

Figure 17:
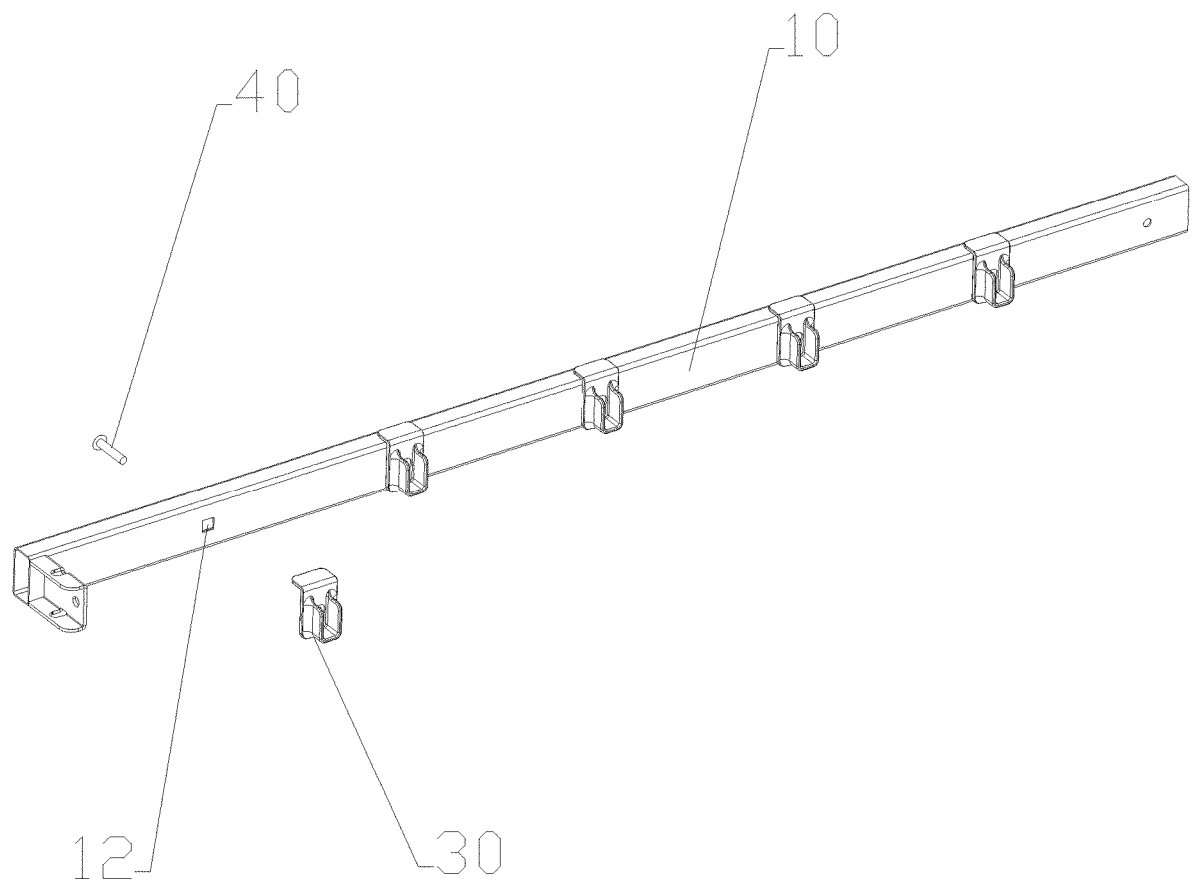
FIG. 17 is a schematic view showing the connecting member mounted on the side rail according to the seventh embodiment of the present invention.
Figure 18:
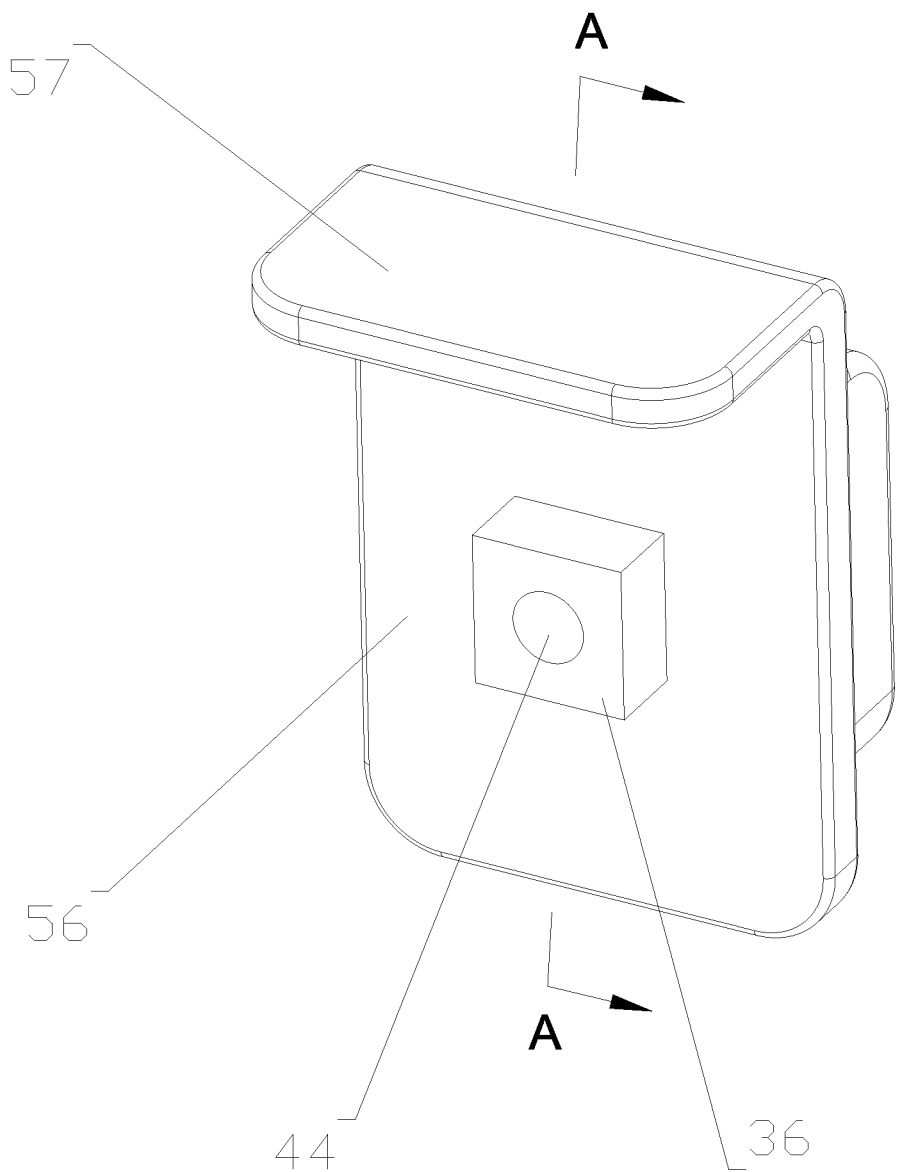
FIG. 18 is a perspective view of the connecting member according to the seventh embodiment of the present invention.
Figure 19:
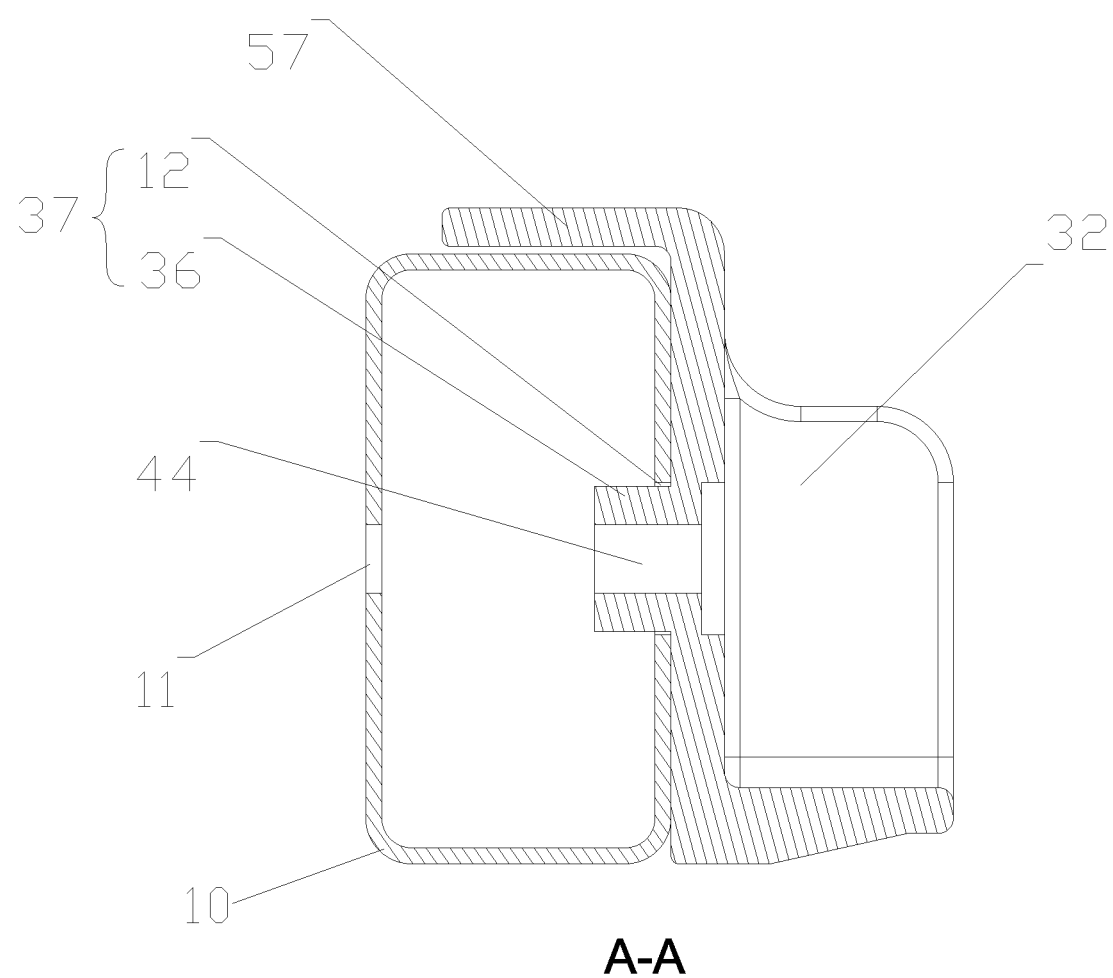
FIG. 19 is a cross-sectional view of the connecting member along the A-A direction in FIG. 18 assembled with the side rail.

In the seventh embodiment of the present invention, referring to FIG. 17-FIG. 19, the difference from the sixth embodiment is that the first hole 44 is overlapped with the protruding block 36, and the aligning hole 12 is overlapped with the second hole 11. The protruding block 36 and the aligning hole 12 each are in a polygon shape, and the polygon shape includes but not limited to rectangle, square, triangle, hexagon, and star shape.

The preferred embodiments of the present invention have been described by the foregoing description. As mentioned above, it should be understood that the present invention is not limited to the preferred embodiments disclosed herein and should not be construed as an exclusion from other embodiments. The present invention can be used in various other combinations, modifications, and environments, and can be modified within the scope of the present invention described herein based on the above teachings or technology or knowledge in the related field. The modifications and variations made by those skilled in the art without departing from the spirit and scope of the present invention shall fall within the scope of protection of the appended claims of the present invention.

What is claimed is:

1. A mounting structure for a bedstead, comprising:
a side rail of the bedstead, and
a cross rail of the bedstead;
wherein
the side rail and the cross rail are connected by a connecting member; the connecting member comprises a body;
the body is provided with a first hole and a U-shaped groove, the cross rail is clamped in the U-shaped groove, and the first hole is located in a middle part of the U-shaped groove;
the side rail is provided with a second hole matching with the first hole; and
an inserting member is connected to the cross rail after sequentially passing through the second hole and the first hole.

2. The mounting structure for the bedstead according to claim 1, wherein the body comprises a first piece body and a second piece body, the first piece body and the second piece body is formed in an L-shaped configuration, and the U-shaped groove and the first hole are provided on the first piece body.

3. The mounting structure for the bedstead according to claim 2, wherein an aligning structure is provided between the connecting member and the side rail, and the aligning structure is configured to align the first hole and the second hole.

4. The mounting structure for the bedstead according to claim 2, wherein the inserting member is detachably connected to the cross rail.

5. The mounting structure for the bedstead according to claim 4, wherein the inserting member is a connecting screw or a connecting bolt.

6. The mounting structure for the bedstead according to claim 4, wherein an end of the cross rail is provided with a third hole matching with the first hole and the second hole, and the inserting member is engaged into the third hole after passing through the second hole and the first hole.

7. The mounting structure for the bedstead according to claim 2, wherein the first hole is in a stepped configuration, a diameter of the first hole at a side adjacent to the U-shaped groove is larger than a diameter of the first hole at a side adjacent to the side rail.

8. The mounting structure for the bedstead according to claim 1, wherein an aligning structure is provided between the connecting member and the side rail, and the aligning structure is configured to align the first hole and the second hole.

9. The mounting structure for the bedstead according to claim 8, wherein the aligning structure comprises a protruding block and an aligning hole matching with each other, the protruding block is provided on a side of the body opposite to the U-shaped groove, and the aligning hole is provided on the side rail and corresponds to the protruding block.

10. The mounting structure for the bedstead according to claim 9, the protruding block is overlapped with the first hole, and the aligning hole is overlapped with the second hole.

11. The mounting structure for the bedstead according to claim 10, the protruding block is in a rectangular shape, and the aligning hole is in a rectangular shape.

12. The mounting structure for the bedstead according to claim 1, wherein the inserting member is detachably connected to the cross rail.

13. The mounting structure for the bedstead according to claim 12, wherein the inserting member is a connecting screw or a connecting bolt.

14. The mounting structure for the bedstead according to claim 12, wherein an end of the cross rail is provided with a third hole matching with the first hole and the second hole, and the inserting member is engaged into the third hole after passing through the second hole and the first hole.

15. The mounting structure for the bedstead according to claim 1, wherein the first hole is in a stepped configuration, a diameter of the first hole at a side adjacent to the U-shaped groove is larger than a diameter of the first hole at a side adjacent to the side rail.

* * * * *